No. 649,052. Patented May 8, 1900.
W. B. HARGAN.
ANIMAL TRAP.
(Application filed Aug. 25, 1899.)
(No Model.)
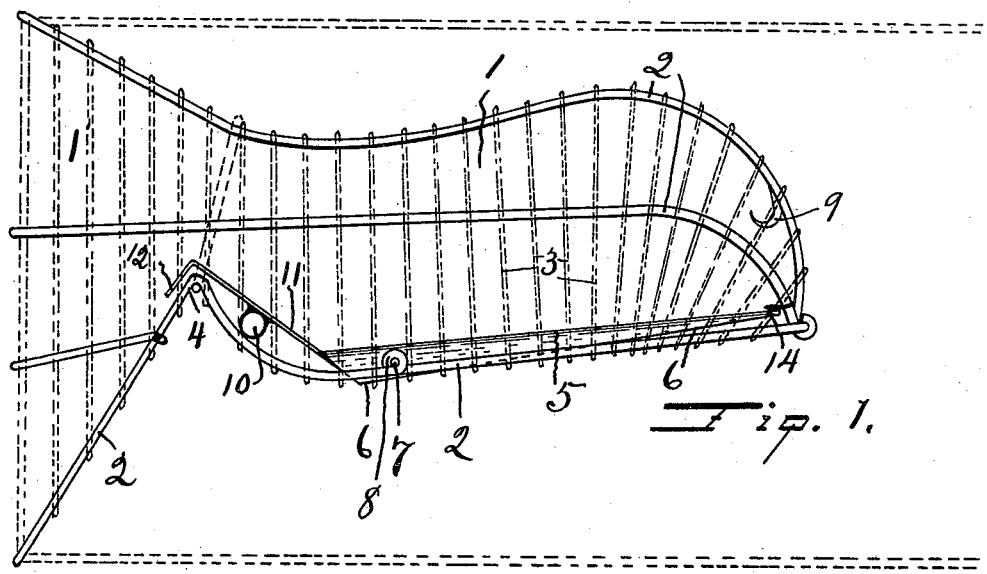
Fig. 1.
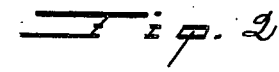
Fig. 2.
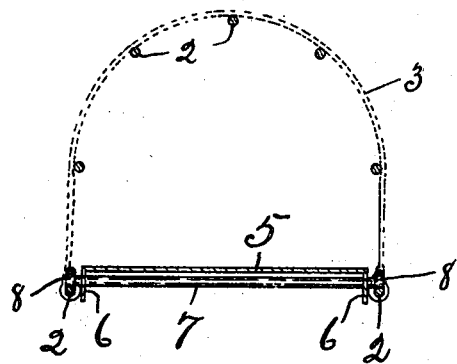
Witnesses
Mabry Haynes
V. A. Webster
Inventor
William B. Hargan
By Joshua B. Webster
Attorney

UNITED STATES PATENT OFFICE.

WILLIAM B. HARGAN, OF STOCKTON, CALIFORNIA.

ANIMAL-TRAP.

SPECIFICATION forming part of Letters Patent No. 649,052, dated May 8, 1900.

Application filed August 25, 1899. Serial No. 728,402. (No model.)

*To all whom it may concern:*

Be it known that I, WILLIAM B. HARGAN, a citizen of the United States, residing at Stockton, in the county of San Joaquin and State of California, have invented certain new and useful Improvements in Animal-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain new and useful improvements in animal-traps, such as are used to effectually catch and retain vermin, such as rodents and the like, in vast numbers; and it consists in the peculiar construction, novel combination, and adaptation of parts hereinafter described, and particularly pointed out in the claims hereunto annexed, reference being had to the accompanying drawings for a better comprehension hereof, in which—

Figure 1 is a side elevation of my improvement, showing its connection with what is old by dotted lines. Fig. 2 represents a vertical cross-section of the same.

Similar figures of reference indicate corresponding parts in the views.

Many features of my trap are old, and I therefore will dispense with such in both drawings and description.

I employ any suitable inclosure, preferably of wire, with one end closed and one end open. In the open end thereof a funnel-shaped entrance 1 is placed and rigidly maintained, as shown in Fig. 1. Said funnel-shaped entrance is constructed of longitudinal wires 2, arranged in circular form in transverse section, as shown in Fig. 2. Over the sides and top of said frame of longitudinal wires 2 a suitable network of smaller wires 3 may be arranged at will. The under wires 2 at the point 4 are bent upward, forming an angle in the bottom and a narrow neck in the body at that point.

The bottom near the inner end is a trapdoor composed of a smooth piece of metal 5, such as tin, which has its sides 6 bent downward at right angles to the body thereof, said sides having an axis or hinge 7 rigidly inserted transversely therein, said axis 7 having its ends pivotally journaled in loops 8 in the lower wires 2 on either side at a suitable point thereon. The rear end 11 of the trapdoor 5 extends rearwardly beyond the axis 7 at an angle to a point above the angle 4 in the bottom wires 2, whereupon said extreme rear end 12 is angled downward, as shown in Fig. 1. A suitable projection 14 may be attached to the end of one of the wires 2 for the purpose of preventing the excessive upward tilting of the trap-door 5. A suitable weight 10 is compactly arranged and rigidly attached to the under side of the rear end of the trap-door 5 for the purpose of maintaining the said trap-door 5 in normal closed position.

9 is a hook for bait.

The *modus operandi* is as follows: A bait suited to the taste of the vermin sought after is placed on the hook 9, and the whole trap is placed near the haunts of said vermin. Attracted by the bait the vermin enter the funnel-shaped entrance and crawl through the narrow neck at 4, and by their endeavor to reach the bait pass beyond the pivot or hinge 7, whereupon the most weight being upon the front end of the trap-door 5 the same is tilted, precipitating the vermin into the inclosure, and the weight 10 carries the door 5 back to its original closed position ready for the entrance of another vermin which may enter in the same manner.

The principal feature of my invention is the angularly-disposed rear end 11 and 12 of the door 5. By having the rear end 11 12 extended rearwardly beyond the pivot 7 the same presents a comparatively-rigid path for the vermin until its body is partially or wholly through the neck at 4, thereby inspiring said vermin with confidence, and when the trapdoor 5 is tilted the end 11 being at an angle presents no means by which the vermin can cling, but rather tends to enhance its progress into the inclosure and shuts off its possible retreat through the neck at 4, leaving its only avenue of escape into the inclosure.

I am well aware that animal-traps have been made which comprise bottle-shaped sections reëntering one another and having a trap-door located therein, and these features I do not claim, broadly; but

What I claim as new, and desire to secure by Letters Patent, is—

1. In an animal-trap of the class described, the combination with a suitable retaining-inclosure, of a funnel-shaped entrance of suitable wire-netting inserted in one end of said inclosure, the neck at 4 in said entrance formed by the angularly-disposed bottom, the tilting trap-door 5 pivoted on either side to the entrance and having the angularly-disposed rear end 11 12 and the weight 10 rigidly attached to said rear end all arranged and operating substantially as shown and described and for the purposes set forth.

2. In a trap of the class described, the combination with a suitable retaining-inclosure, the entrance 1 2 3, the angular bottom at 4, the trap-door 5 6 having the axle 7 which is pivoted in the loops 8, the angularly-disposed rear end 11 12 of the trap-door 5, the weight 10 rigidly attached to said end 11 12, the stop 14, and the hook 9 all arranged and operating substantially as shown and for the purposes set forth herein.

In testimony whereof I affix my signature in presence of two witnesses.

WILLIAM B. HARGAN.

Witnesses:
MOLBRY HAYNES,
JOSHUA B. WEBSTER.